(12) United States Patent
Mizes

(10) Patent No.: US 7,375,740 B2
(45) Date of Patent: May 20, 2008

(54) METHOD AND APPARATUS FOR ADJUSTING PRINTBAR UNIFORMITY

(75) Inventor: Howard A. Mizes, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 197 days.

(21) Appl. No.: 11/188,300

(22) Filed: Jul. 25, 2005

(65) Prior Publication Data

US 2007/0019065 A1   Jan. 25, 2007

(51) Int. Cl.
   B41J 2/47    (2006.01)
   B41J 2/435   (2006.01)
(52) U.S. Cl. ...................... 347/240; 347/236
(58) Field of Classification Search .............. 347/240, 347/238, 236; 358/1.13, 1.9
   See application file for complete search history.

(56) References Cited

U.S. PATENT DOCUMENTS

| | | | |
|---|---|---|---|
| 5,469,267 A * | 11/1995 | Wang | 358/3.21 |
| 5,668,587 A | 9/1997 | Hammond | |
| 5,859,658 A | 1/1999 | Hammond | |
| 6,191,867 B1 * | 2/2001 | Shor et al. | 358/1.9 |
| 6,252,679 B1 * | 6/2001 | Wang | 358/1.9 |
| 6,304,340 B1 * | 10/2001 | Wang | 358/1.9 |
| 6,435,643 B1 * | 8/2002 | Miura et al. | 347/19 |
| 6,618,158 B1 * | 9/2003 | Brown et al. | 358/1.13 |
| 6,819,352 B2 * | 11/2004 | Mizes et al. | 347/240 |
| 6,917,443 B1 * | 7/2005 | Wang | 358/1.9 |
| 2002/0033851 A1 * | 3/2002 | Waldner et al. | 347/5 |
| 2004/0183886 A1 * | 9/2004 | Regelsberger et al. | 347/130 |

* cited by examiner

Primary Examiner—Hai C Pham
Assistant Examiner—Kainoa B Wright
(74) Attorney, Agent, or Firm—Fay Sharpe LLP

(57) ABSTRACT

In a printing system, a method is used for adjusting currents to LEDs in an LED printbar to achieve uniformity of the print. The line test pattern and halftone strips test pattern are printed. The test patterns are scanned. An LED line metric of each LED test pattern line and reflectance uniformity of each halftone test strip are measured. A line uniformity difference profile and a set of halftone strips uniformity difference profiles are concurrently calculated. A current value supplied to each LED associated with the test patterns is adjusted to simultaneously optimize the uniformity in the lines test pattern and the halftone strips test pattern.

19 Claims, 15 Drawing Sheets

METHOD AND APPARATUS FOR ADJUSTING PRINTBAR UNIFORMITY

BACKGROUND

The present exemplary embodiment relates to printing systems. It finds particular application in conjunction with adjusting print uniformity by adjusting current to individual light emitting diodes (LEDs) in an LED printbar of a xerographic device and will be described with the particular reference thereto. However, it is to be appreciated that the present exemplary embodiment is also amenable to other like applications.

Light emitting diode (LED) full width array imagers are commonly used as an exposure mechanism in a printer. Typically, such imagers include an arrangement of a large number of closely spaced LEDs in a linear array. By providing relative motion between the LED printbar and a photoreceptor, and by selectively energizing the LEDs at the proper times, a desired latent electrostatic image is produced on the recording member. The production of a desired latent image is usually performed by having each LED expose a corresponding pixel on the recording member in accordance with the image-defining video data information applied to the printbar through the driver circuitry. Driver circuits of the individual LEDs are selectively energized to turn the LEDs ON/OFF at fixed intervals to form a line exposure pattern on the surface of the photoreceptor. A complete image is formed by successive line exposures.

Due to manufacturing variations, aging and environmental conditions, the LED imagers output a nonuniform exposure profile. Such variations in light output expose the photoreceptor differently which results in undesirable streaks in the image.

One technique to correct the LED output uniformity is to monitor the response of individual LEDs on the print. The output of each individual LED is printed as a test pattern of single pixel wide lines parallel to the process direction. Single pixel lines are written with only one LED, so that the optical density profile of that line is related to the corresponding LED's exposure profile. The optical density profile can be measured by scanning the test print. The lines are well separated so that changes in the reflectance profile of one line do not influence a measurement of the reflectance profile of another line. A metric derived from the optical density profile of each line, such as the line width, is correlated to that LED's exposure. The current supplied to each LED in the LED print bar is adjusted until the width of each line is within a predetermined threshold or target width.

The width of the printed line depends on the total intensity of the LED. However, the width of the printed line also depends on the spatial profile of the spot emitted from the LED and focused on the photoreceptor. Beams of the same total intensity may give different line widths because one beam has a narrow profile and the other beam has a wide profile. Therefore, adjusting the LED currents to give uniform line widths may result in different integrated intensities.

In a typical printer, the beams from two neighboring LEDs overlap. The exposure profile is a sum of the individual exposure profiles. However, because of nonlinearities in the xerographic process, the profile of the developed toner on the paper for the double pixel wide line is not necessarily equal to the sum of the two developed toner profiles for the single pixel wide lines. In other words, different pairs of LEDs that individually produce lines of equal widths can produce double pixel wide lines of different widths.

Typically, a halftone strip is composed of a screen of dots. Most of the dots are written by two or more adjacent LEDs. For the same reason different sets of two pixel wide lines can be different in width, halftone dots printed with different sets of LEDs do not necessarily have to be equal in size, even though the individual lines that they print all have the same width.

Another approach to achieve cross process uniformity is to monitor the uniformity of one or more halftone strips and adjust the LED currents to increase the uniformity of the halftone strips. In this approach, however, it is problematic to determine which LED must be adjusted to force a change in density of a narrow streak. Specifically, if a particular halftone dot is too light, and that halftone dot is written by two or more LEDs, it is not possible without additional information to determine which LED must be adjusted to increase the density of that halftone dot in a way that does not degrade the appearance of other halftone screen or line art images.

There is a need for methods and apparatuses which overcome the aforementioned problems and others.

CROSS REFERENCE TO RELATED PATENTS

The following patent, the disclosure of which being totally incorporated herein by reference is mentioned: U.S. Pat. No. 6,819,352, issued Nov. 16, 2004 for METHOD OF ADJUSTING PRINT UNIFORMITY to Mizes, et al.

REFERENCES

U.S. Pat. No. 5,668,587, issued Sep. 16, 1997 to Hammond, discusses a technique for adjustment of LED current for LEDs in a printbar based on accumulated counts representative of LED "on" time.

U.S. Pat. No. 5,859,658, issued Jan. 12, 1999 to Hammond discusses an adjustment of LED current for LEDs in a printbar based on changes in the I-V characteristics of the LED.

However, these patents do not discuss achieving simultaneous uniformity for single pixel lines and halftones.

BRIEF DESCRIPTION

According to one aspect, a method of adjusting print uniformity for a xerographic device having an LED printbar is disclosed. A lines test pattern is printed on a first target media in a process direction of the xerographic device, each test pattern line being associated with an individual LED of the LED printbar. A halftone strips test pattern is printed on a second target media in the process direction of the xerographic device, each halftone test strip including an arrangement of dots, each dot being associated with designated LEDs of the LED printbar and each halftone strip being associated with a halftone gray level i. The first and second target media may be the same piece of paper. The first and second target media with the test patterns are scanned. An LED line metric profile is calculated by reducing the profile of each line to a single number. A reflectance uniformity profile of each test halftone strip is measured. A lines uniformity difference profile, and a set of halftone strips uniformity difference profiles are calculated concurrently which includes calculating first differences between each LED line metric and a first target value, and calculating second differences between each halftone strip uniformity profile and a second target value. Current value supplied to each LED associated with the test patterns is adjusted to simultaneously optimize the uniformity in the lines test pattern and the halftone strips test pattern.

According to another aspect, a xerographic device is disclosed. An LED printbar prints a test pattern on a target media, which LED printbar includes a plurality of LEDs. A scanner device scans the target media and detects the printed test pattern on the target media. A computer, which is in operative communication with the LED printbar and the scanner, is programmed to iteratively determine first measurements for repeated lines of a lines test pattern, each repeated line being printed with an associated LED of the printbar, determine second measurements for a halftone strips test pattern, each halftone strip including a plurality of prearranged dots, which determines the halftone strip density, each dot being associated with designated LEDs of the printbar, concurrently calculate a lines uniformity difference profile, and a set of halftone strips uniformity difference profiles, including calculating first differences between the first measurements of each test pattern line and a first target value, and second differences between the second measurements of each halftone test strip and a second target value, compute current values supplied to each LED associated with the test patterns to simultaneously optimize uniformity in the lines test pattern and the halftone strips test pattern, adjust input current supplied to each LED associated with the test patterns by a fraction to partially reduce the differences, facilitate reprinting of the test patterns with the adjusted input currents, facilitate scanning and remeasuring of the reprinted test patterns, and terminate the iterations when the uniformity of the test patterns meets a predetermined uniformity criteria.

BRIEF DESCRIPTION OF THE DRAWINGS

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. Within the drawings, like reference numerals denote like elements.

DETAILED DESCRIPTION

Figure 1:
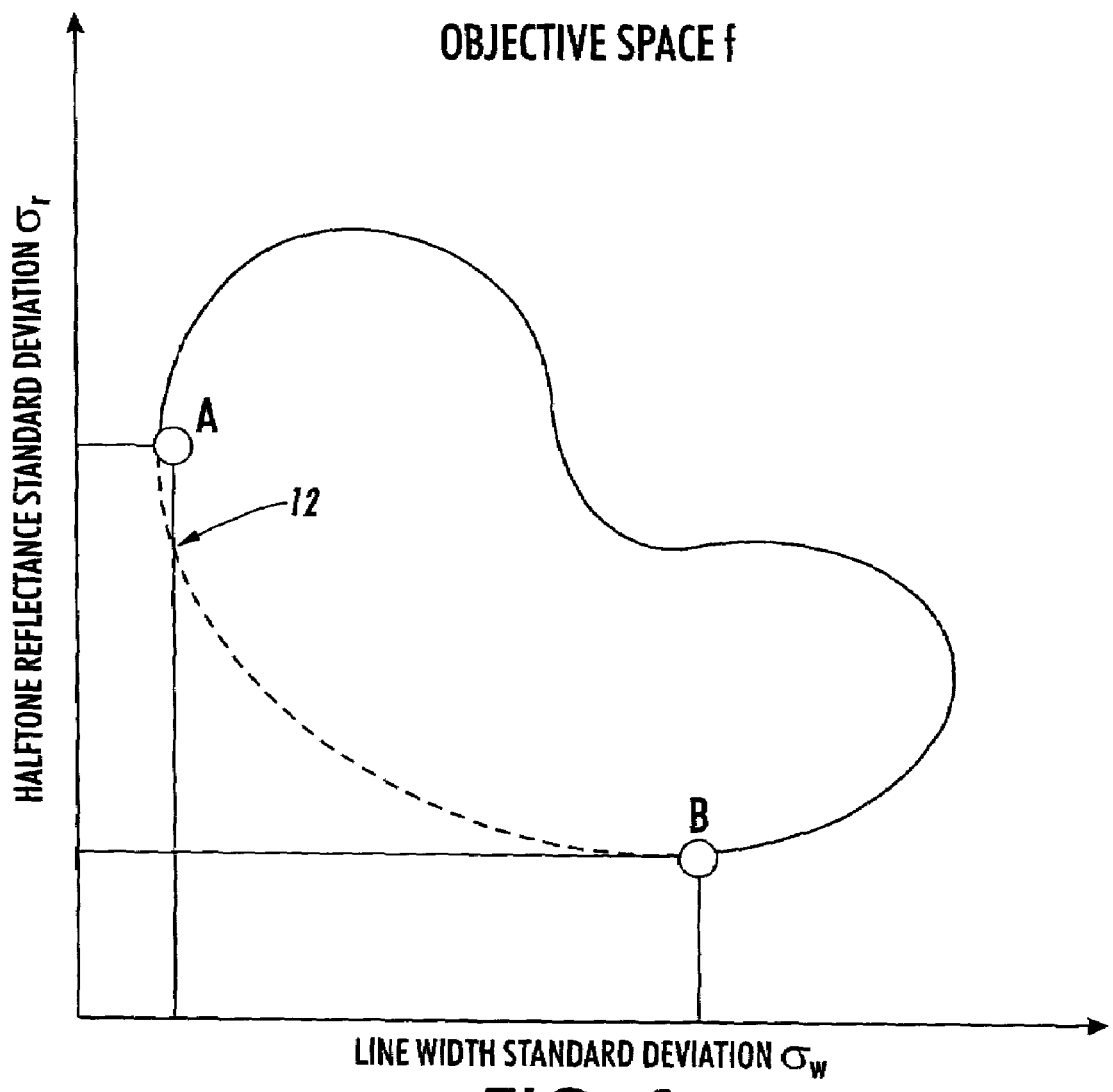
FIG. 1 is a graphical representation of a Pareto curve.

With reference to FIG. 1, the adjustment of the currents in the LED elements to achieve both uniform lines and uniform halftones can be cast as a multiobjective optimization problem. As discussed in the background, simultaneous optimization of single pixel lines and uniform halftones cannot be achieved. Generally, from the single pixel line width profile and from the halftone uniformity reflectance profile, a single metric can be extracted. One possible metric is $\sigma_w$, the standard deviation of the line widths, and $\sigma_r$, the standard deviation of the descreened halftone reflectance. The standard deviation of the line widths $\sigma_w$ can be made small at the expense of the descreened halftone reflectance $\sigma_r$, and likewise, the descreened halftone reflectance $\sigma_r$ can be made small at the expense of the standard deviation of the line widths $\sigma_w$. A Pareto curve 12 can be defined in a space of $\sigma_r$ vs. $\sigma_w$ for all possible LED settings. Points to the upper right of the Pareto curve can be achieved for one or more particular settings of the LED currents. Points to the lower left on the Pareto curve cannot be achieved for any settings. Points on the Pareto curve are the optimal settings for achieving the smallest standard deviation of the line widths $\sigma_w$ for a given descreened halftone reflectance $\sigma_r$.

Figure 2:
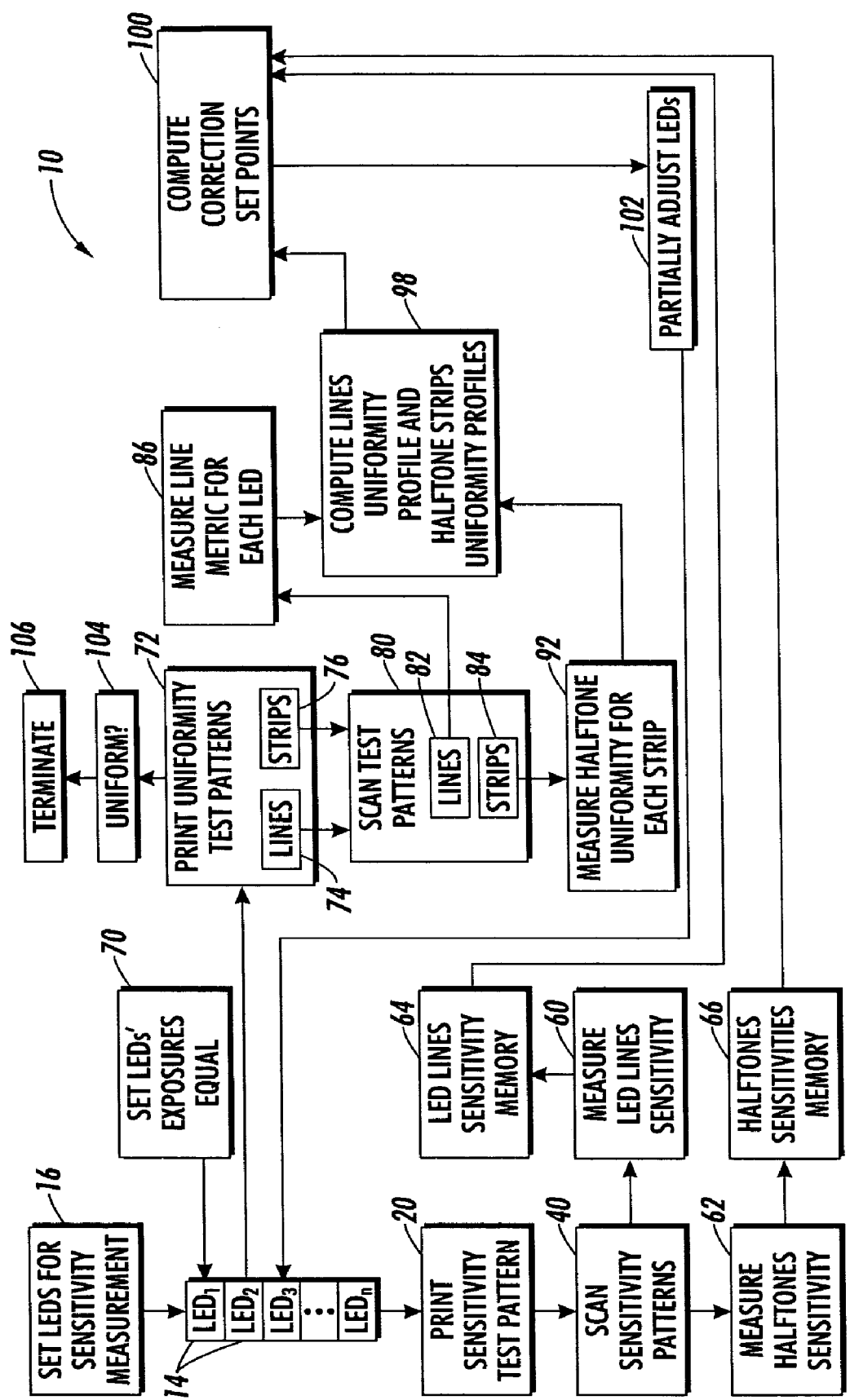
FIG. 2 is a flow chart of a control methodology approach.
Figure 3:
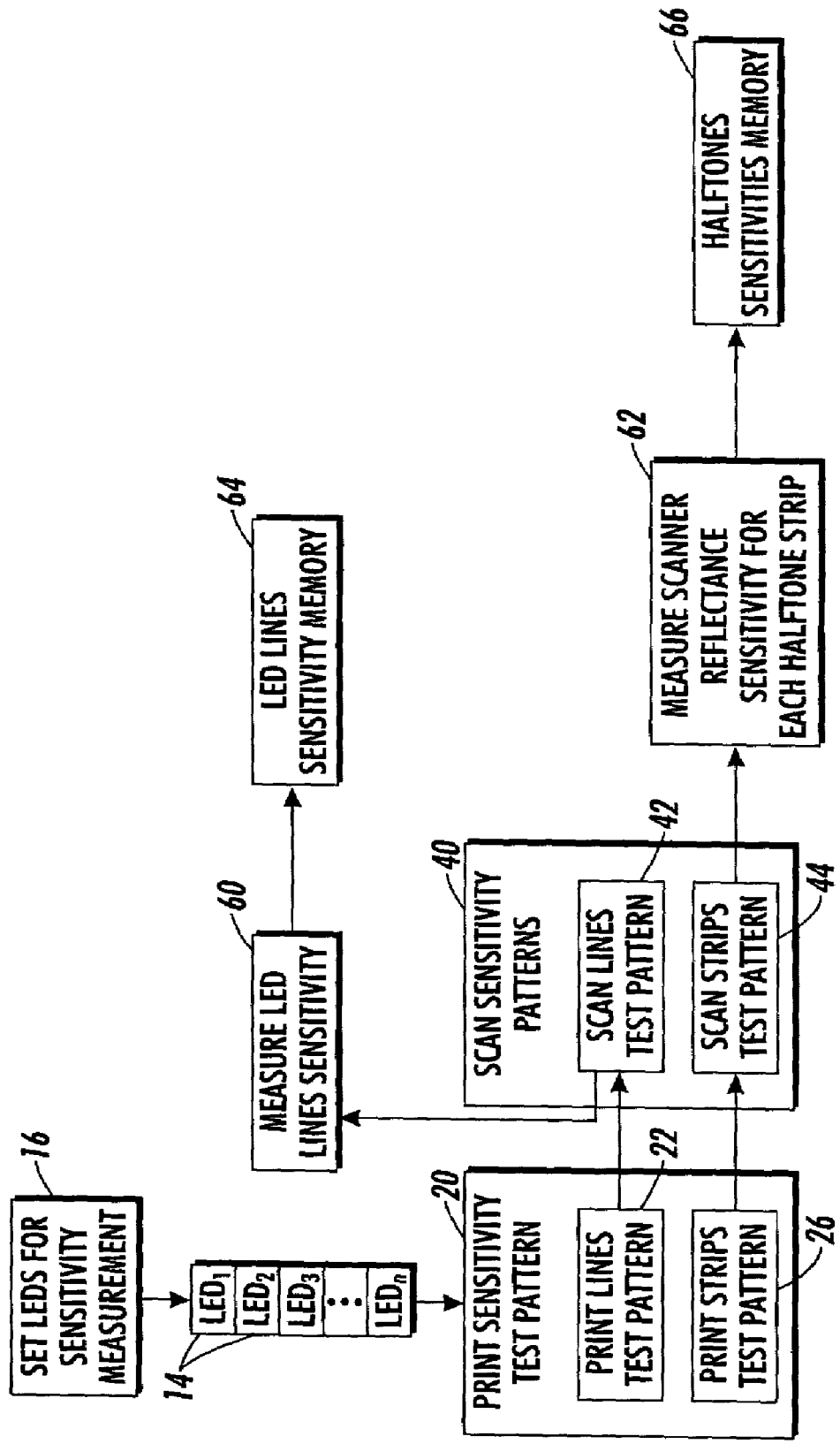
FIG. 3 is a flow chart of a detailed portion of a control methodology approach.
Figure 4:
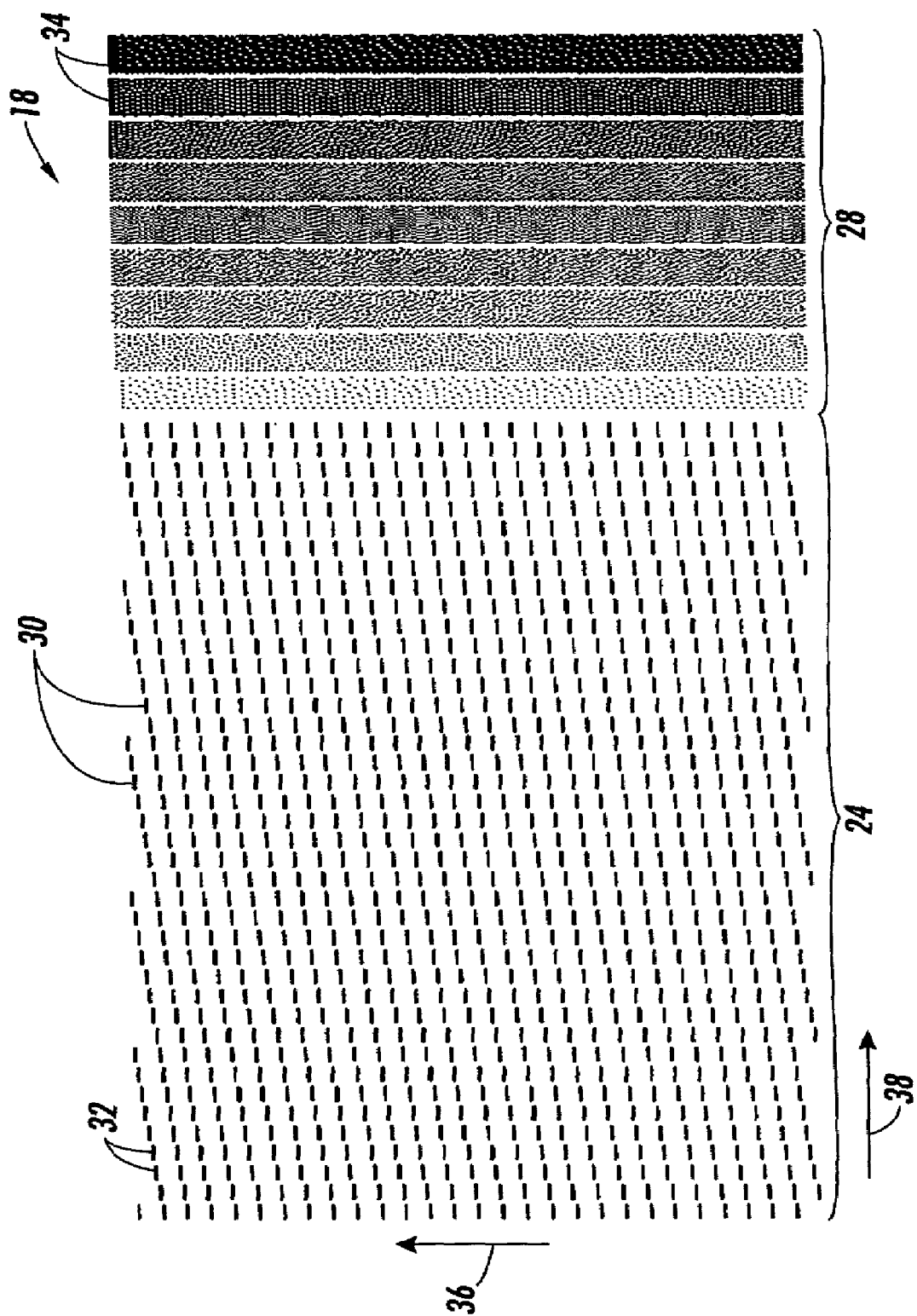
FIG. 4 is an image of a test pattern which includes lines printed with individual LEDs and halftone strips including dots printed with associated LEDs.

With reference to FIG. 2, 3 and 4, the individual adjustment of each LED element 14 of the printbar is typically made by controlling an output current of an associated digital to analog converter, or $U_{DAC}$. For example, a 6-bit digital to analog converter $U_{DAC}$ could be used to control individual LED input current. The 6-bit $U_{DAC}$ can be set to 64 different values representing 64 selectable LED input currents. The $U_{DACs}$ are selectively set 16 to the known settings, and a sensitivity test pattern or print 18 is printed 20, including printing 22 a lines test pattern 24 and printing 26 a halftone strip test pattern 28. In one embodiment, the lines test pattern 24 includes a series of line pattern strips 30, each single line 32 being printed by an individual LED 14 such that the line width from every LED 14 can be determined. In one embodiment, the halftone strip pattern 28 includes a set of nine halftone strips 34 varying from about 10% to about 90% area coverage in about 10% increments. The long direction of the line strips 30 is perpendicular to a process direction 36. Each line strip 30 is characterized by a pattern in which one LED line is ON and n LED lines are OFF. Each line strip 30 in the line test pattern 24 is offset from the adjacent strip 30 by a number of pixels. When the print is scanned, the intensity of each LED 14 can be measured via the single pixel lines in the line test pattern 24. The number of the LED OFF lines is a large number so that there is no interaction between the single lines 32. E.g., if the width of one line 32 increases due to a brighter LED, the line 32 with the increased width has no effect on the width measurement of neighboring lines.

In the LED printbar uniformity adjustment, there is measurement noise which requires multiple measurements to generate an accurate model. Specifically, one source of noise is a process direction banding. Process direction banding can arise from subsystems other than the LED imager. Motion quality and other like factors can also change the optical density of the lines. The effect of banding is that each strip of lines might have a different average width, even though the average LED intensity is similar. In one embodiment, to increase robustness, the lines test print 24 includes a set of lines 32 in random positions in a cross process direction 38. Each random line 32 is associated with the individual LED 14 of the LED printbar and printed at a sufficient separation from the adjacent test pattern lines 32. Randomizing the line positions allows one to distinguish the artifacts of banding from a true change in the line width. For each LED 14, a line width measurement can be made at different points on the page, which improves the measurement accuracy.

The sensitivity test patterns 24, 28 are scanned 40, including scanning 42 of the sensitivity lines test pattern and scanning 44 of the sensitivity halftones strips test pattern, and measuring associated line metrics and halftone strip metrics as discussed in a greater detail below.

Figure 5:
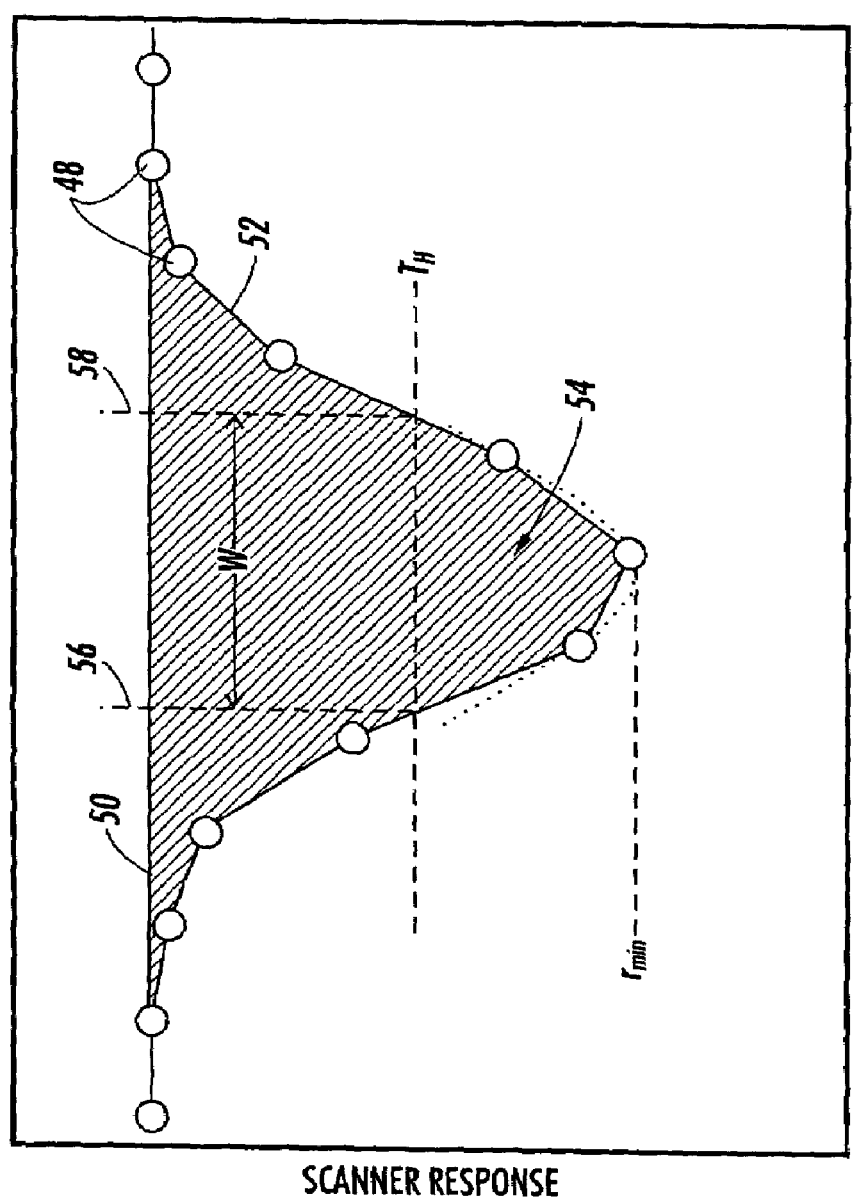
FIG. 5 shows an example of cross-section measurements in the vicinity of a line of the lines test pattern.
Figure 5:
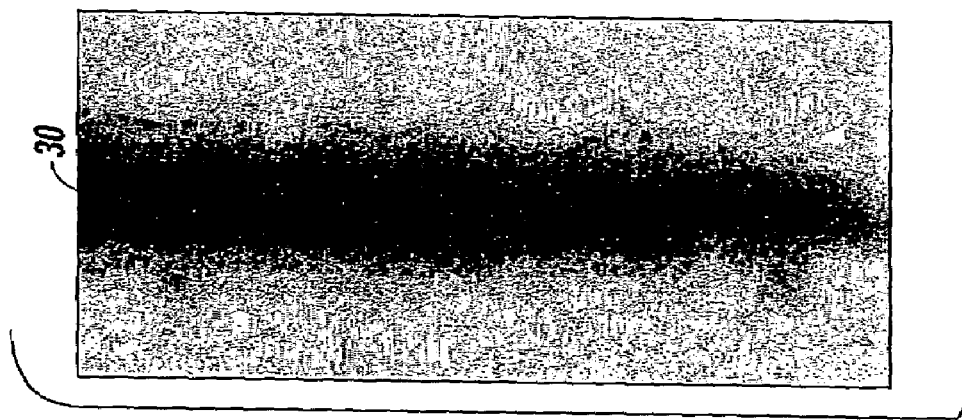

With reference to FIG. 5, the scanner response at the position of each line 32 provides of an array of reflectance measurements 48 that are relatively low in value when the scanner sensor detects an imaged portion of the line and relatively high in value when the scanner sensor detects an imaged portion of a media. The scanner response in the vicinity of each line can be averaged over all pixels running parallel to the line to obtain one or more cross section measurements associated with the line. From the cross section measurements 48, the various metrics related to the LED intensity can be extracted. One cross section metric, for example, is the integral of one or more cross section measurements, i.e., integrated line reflectance metric. A line 50 represents the average reflectance of the target media while a line 52 represents a curve fitted to the reflectance measurements 48 for the cross section shown. The area 54 between lines 60 and 52 represents the integrated line reflectance metric.

Another metric of the lines uniformity is the sum of the differences between the reflectance measurements associated with the line and the average reflectance of the target media (i.e., summed line reflectance metric). Another cross section metric is the minimum value for the reflectance measurements over the one or more cross sections (i.e., minimum line reflectance metric, $r_{min}$). For example, $r_{min}$, represents the minimum reflectance metric for the cross section. Yet another metric can be obtained by defining a threshold reflectance value that is compared to the profile of the one or more cross section reflection measurements (i.e., line width metric). For example, w represents the line width metric for the cross section. The line width w is defined as the spacing between intersections 56, 58 of the line 52 with a user specified threshold $T_H$. The choice of the threshold reflectance value $T_H$ is typically chosen to be a value that provides sufficiently high sensitivity to the changes in the line profile, utilizing one of the image analysis algorithms known in the art. More specifically, the image algorithm takes as an input the scanned test pattern 18 and returns metric corresponding to the exposures of the individual LEDs.

Using a key file that relates the position of the lines in the test pattern to the LED index, the algorithm automatically performs the ordering and the averaging of the multiple line repeats. The algorithm is robust against print defects that might typically appear in the print as well as against process direction banding by forcing the average of each row of test pattern lines to be equal.

With reference again to FIG. 2 and 3, an average sensitivity $g_o$ of the line width to the change in exposure is measured 60 for each LED, and an average halftone strip of scanner reflectance sensitivity $g_r$ to the change in exposure is measured 62 for each halftone strip. More specifically, in one embodiment, the digital to analog converters are split into sets of 32 $U_{DAC}$. The sets of 32 $U_{DAC}$ are set 16 to alternate between the higher and lower current values, such as 36 and 26. E.g., a first set of 32 $U_{DAC}$ is set to a current value of 36, a second set of 32 $U_{DAC}$ is set to a current value of 26, a third set of 32 $U_{DAC}$ is set to a value of 36, a fourth set of 32 $U_{DAC}$ is set to a value of 26, and the like. A first sensitivity test pattern is printed. The higher and lower $U_{DACs}$ are switched and a second sensitivity test pattern is printed. The first and second sensitivity patterns may have the graphics of the test pattern 18 or any other appropriate graphics. A constant is added to the average line width of the first sensitivity pattern to offset and force-the average line width of the first sensitivity pattern to match the average line width of the second sensitivity pattern to compensate for printer tone reproduction curve (TRC) drift. The sensitivity is generally proportional to the difference in the line width difference between each line in the first and second sensitivity patterns. More specifically, the first and second sensitivity patterns are scanned 40. The average sensitivity go of the line width to the change in exposure for each LED is determined by taking a first average line width $<W_{36}>$ from a plurality of lines written with the higher set $U_{DAC}$, a second average line width $<W_{26}>$ from a plurality of lines written with the lower set $U_{DAC}$, subtracting the second average line width $<w_{26}>$ from the first average $<W_{36}>$ line width and dividing the result of subtraction by 10:

$$g_0 = (<w_{36}> - <w_{26}>)/10$$

The measured sensitivity of each LED to the change in exposure are stored in a LED lines sensitivity memory 64.

With continuing reference to FIGS. 2 and 3, the average halftone strip reflectance sensitivity $g_r$ to the change in exposure is determined 62 for each test halftone strip 34 by taking measurements of the first and second sensitivity patterns. More specifically, the average halftone reflectance sensitivity $g_r$ to the change in exposure is determined by measuring a first average scanner reflectance $<r_{36}>$ over the areas written with the higher set $U_{DAC}$, measuring a second average scanner reflectance $<r_{26}>$ over the areas written with the lower $U_{DAC}$, subtracting the second average scanner reflectance $<r_{26}>$ from the first average scanner reflectance $<r_{36}>$, and dividing the subtraction result by 10:

$$g_r = (<r_{36}> - <r_{26}>)/10$$

The measured halftone strips sensitivities to the change in exposures of individual LEDs are stored in a halftones sensitivities memory 66.

Figure 6:
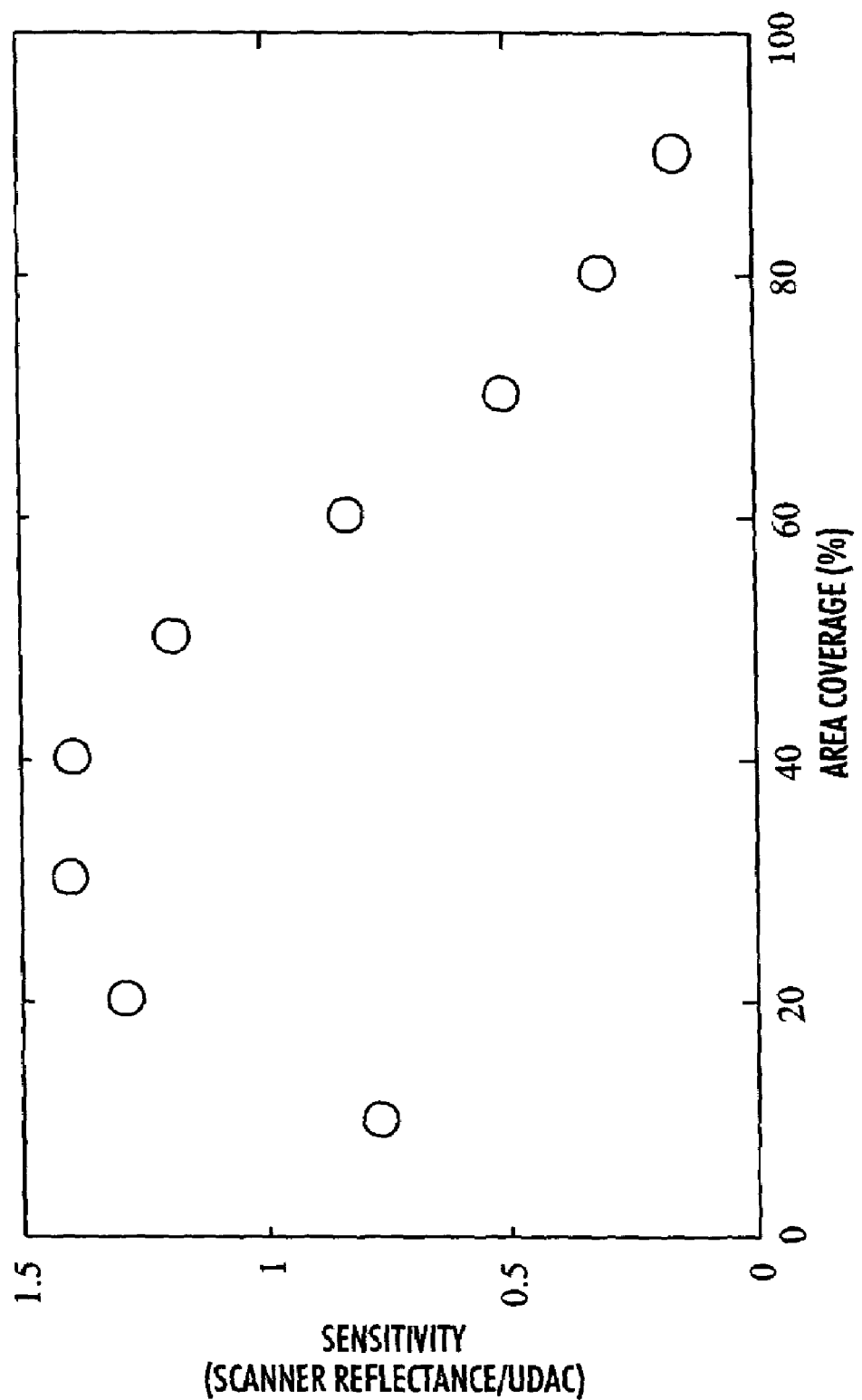
FIG. 6 shows the sensitivity of the halftone reflectance depending on the current setting versus the area coverage.

FIG. 6 shows the sensitivity of the scanner reflectance depending on the $U_{DAC}$ setting versus the area coverage. The sensitivity is dependent on the gray level of the halftone.

Figure 7:
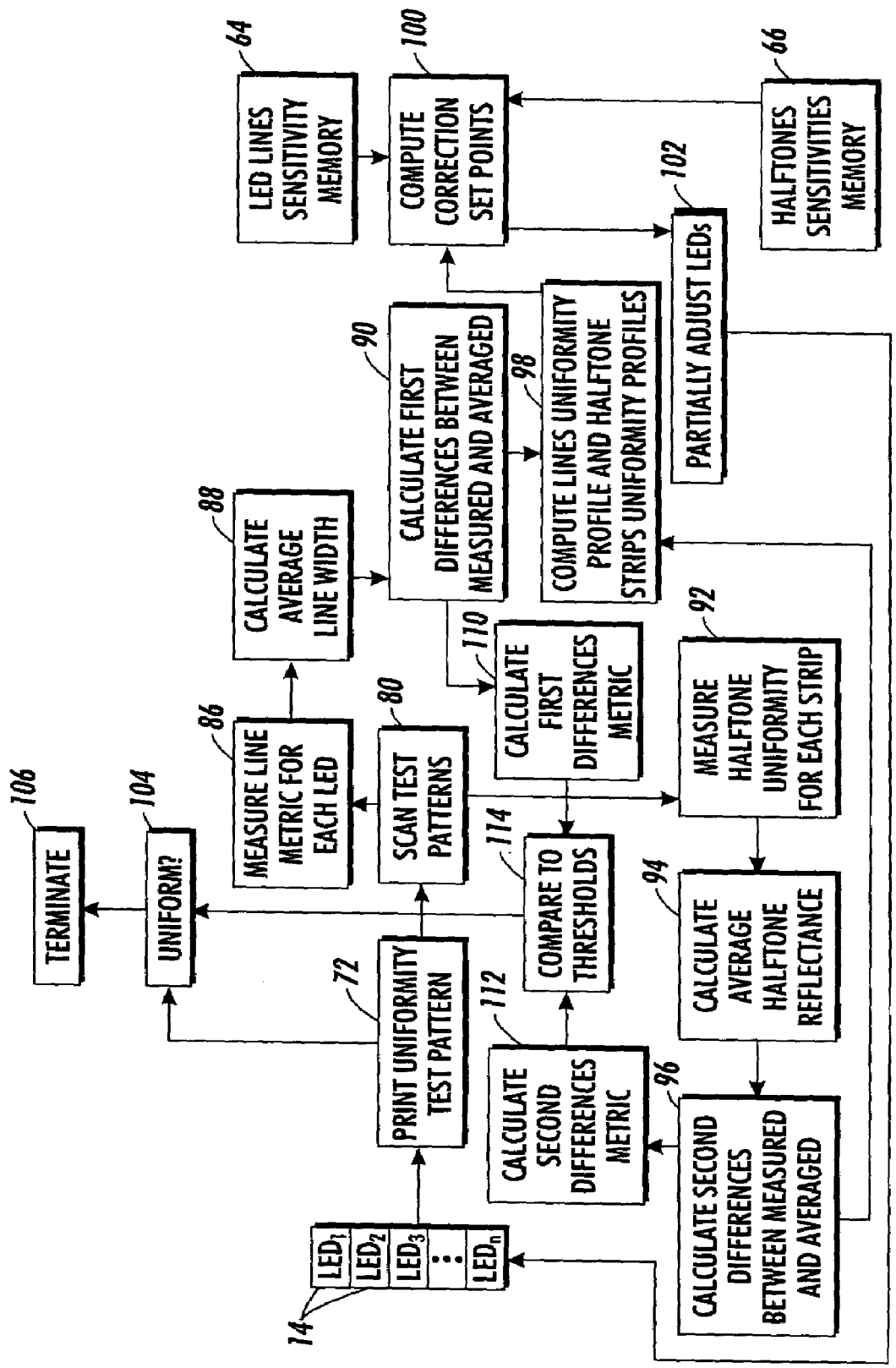
FIG. 7 is a flow chart of another detailed portion of a control methodology approach.

With reference again to FIGS. 2 and 4 and further reference to FIG. 7, for measuring the uniformity, the exposures of the LEDs 14 are set 70 to the equal value, for example, at a halfway between the minimum and maximum set points. Setting the set points to a mid-range helps to ensure that the change in the set points required by the control algorithm would not exceed the dynamic range available. In another embodiment, the set points are set 70 to a set of exposures that are determined from another process as the exposures that produce best uniformity. The uniformity test print 18 is printed 72 for uniformity measurements, including printing 74 of the lines test pattern 24 and printing 76 of the halftone strips test pattern 28. The test patterns 24, 28 might include the graphics as illustrated in FIG. 4 or any other appropriate graphics that indicate the uniformity of the exposure process. The test pattern 18 is scanned 80, including scanning 82 of the lines test pattern 24 and scanning 84 of the halftone strips test pattern 28, on a high resolution flatbed scanner. The test print 18 is typically printed with fiducial marks which are used by the scanner to map the image from the coordinates of the scanner to digital image coordinates using one of well known imaging algorithms. The reflectance measurements of each line are extracted to measure 86 each line's metric, such as the line width $w_i$. More specifically, from the scanned test pattern, an image analysis algorithm measures the width of the lines printed by each LED 14 of the LED printbar. The average line width is calculated 88 for each measured line width $w_i$ of each LED 14 of the LED printbar. First differences between measured and averaged line widths are calculated 90. The halftone strip's metric, such as the halftone strip uniformity or scanner reflectance $r_i$, is measured 92 for each halftone strip. An average halftone or scanner reflectance is calculated 94 for each halftone strip. Second differences between the measured and averaged scanner reflectance are calculated 96 for each halftone strip. Algorithms well known in the field are used to descreen the reflectance profile. A line uniformity profile and a set of halftone strips uniformity profiles are computed concurrently 98.

A new set of current settings or correction set points for the digital to analog converters $U_{DACs}$ is computed 100 to simultaneously optimize the uniformity in the lines test pattern and the halftone strips test pattern according to the Equation (1):

$$u'_i = u_i - (1 - w_g)\left(\frac{f}{g_0}\right)(w_i - \bar{w}) + w_g\left(\frac{f}{g_r}\right)(r_i - \bar{r}), \quad \text{where} \quad (1)$$

$u_i'$ is the new LED intensity setpoint,
$u_i$ is the original LED intensity setpoint,
i is the index of the LED on the printbar,
$g_0$ is the average line width sensitivity to a change in the $U_{DAC}$ setting,
$g_r$ is the average halftone reflectance sensitivity for the graylevel being optimized to a change in the $U_{DAC}$ setting,
f is a gain or a fraction of adjustment to be made each iteration,
$w_i$ is the measured line width of the LED at index i,
$\bar{w}$ is the average line width for the scanned print,
$r_i$ is the measured scanner reflectance at a spatial position corresponding to where the $LED_i$ prints,
$\bar{r}$ is the average scanner reflectance over the halftone strip, and
$w_g$ is the relative weight assigned to gray level in the optimization of the uniformity.

Varying the weight $w_g$ controls the significance given to the lines uniformity or halftones uniformity. For example, if the weight $w_g$ is equal to 0, a line width correction only is performed, e.g. the second term of the Equation (1) becomes 0. As the weight $w_g$ becomes larger, the importance of keeping the gray scale uniform increases. For example, when the weight $w_g$ is equal to 1, only halftone strips uniformity is adjusted, e.g. the first term of the Equation (1) becomes 0. Varying the weight $w_g$ and iterating to completion results in converging to the optimum weight value and finding a set of points that maps the Pareto curve 12 shown in FIG. 1.

Regarding gain f, in the iterative compensation, it is advantageous to make small intensity adjustments every iteration such that the true noise is reduced for smaller values of the gain f every iteration. For example, instead of adjusting the intensity in one step, the intensity is adjusted by a fraction and then another test pattern uniformity measurement is printed and scanned. If the gain f is equal to 1, the full correction is made. The small values of gain f are more effective in decreasing the noise level while achieving the best uniformity. As the gain f becomes smaller, the better noise sensitivity and better uniformity can be achieved at the expense of more iterations and measurements.

In this manner, the partial adjustments are made to simultaneously reduce the first differences between the measured and averaged line widths and the second differences between the measured and averaged halftone strips reflectance.

With reference again to FIG. 1, the performance of the closed-loop can be measured by two metrics: 1) standard deviation of the line widths $\sigma_w$; and 2) standard deviation of the halftone strips reflectance $\sigma_r$. E.g., the constants f and $w_g$ are selected to achieve ultimate uniformity of the lines and halftones at the same time in multiple iterations. The Pareto curve 12 represents the best choice of parameters that can be made. Moving along the Pareto curve 12 represents a tradeoff. E.g., the standard deviation of halftone strips reflectance $\sigma_r$ can be improved without suffering more noise in the line width standard deviation $\sigma_w$. For the example of FIG. 1, the line width standard deviation $\sigma_w$ is a gauge of whether the solution is unstable. The solution becomes unstable where a minimal improvement in the halftone reflectance standard deviation $\sigma_r$ results in a large change in the line width standard deviation $\sigma_w$. Thus, it is advantageous to operate on the stable side of the Pareto curve 12.

With reference again to FIG. 2, after the partial adjustment is made 102 to each $U_{DAC}$, the test pattern 18 is printed again 72, the uniformity measurements are taken, and the process is repeated. In this manner, the LEDs' intensities are adjusted in the iterative process by making small intensity adjustments. When a required uniformity confirming to a uniformity criteria 104 in both test patterns is achieved, the iterative process is terminated 106. For example, the uniformity can be visually inspected by the user.

In another embodiment, to determine when the uniformity correction process should end, a metric of the first differences of the lines uniformity profile is calculated 110. A metric of the second differences of each halftone strip uniformity profile is calculated 112. The metric of the first differences of the line uniformity profile is compared to a first predetermined threshold, while the metric of the second differences of each halftone strip uniformity profile is compared to a second predetermined threshold 114. When the metric of the first differences of the lines uniformity profile is less than the first predetermined threshold, while the metric of the second differences of each halftone strip uniformity profile is less than the second predetermined threshold, the iterative process is terminated 106.

Figure 8:
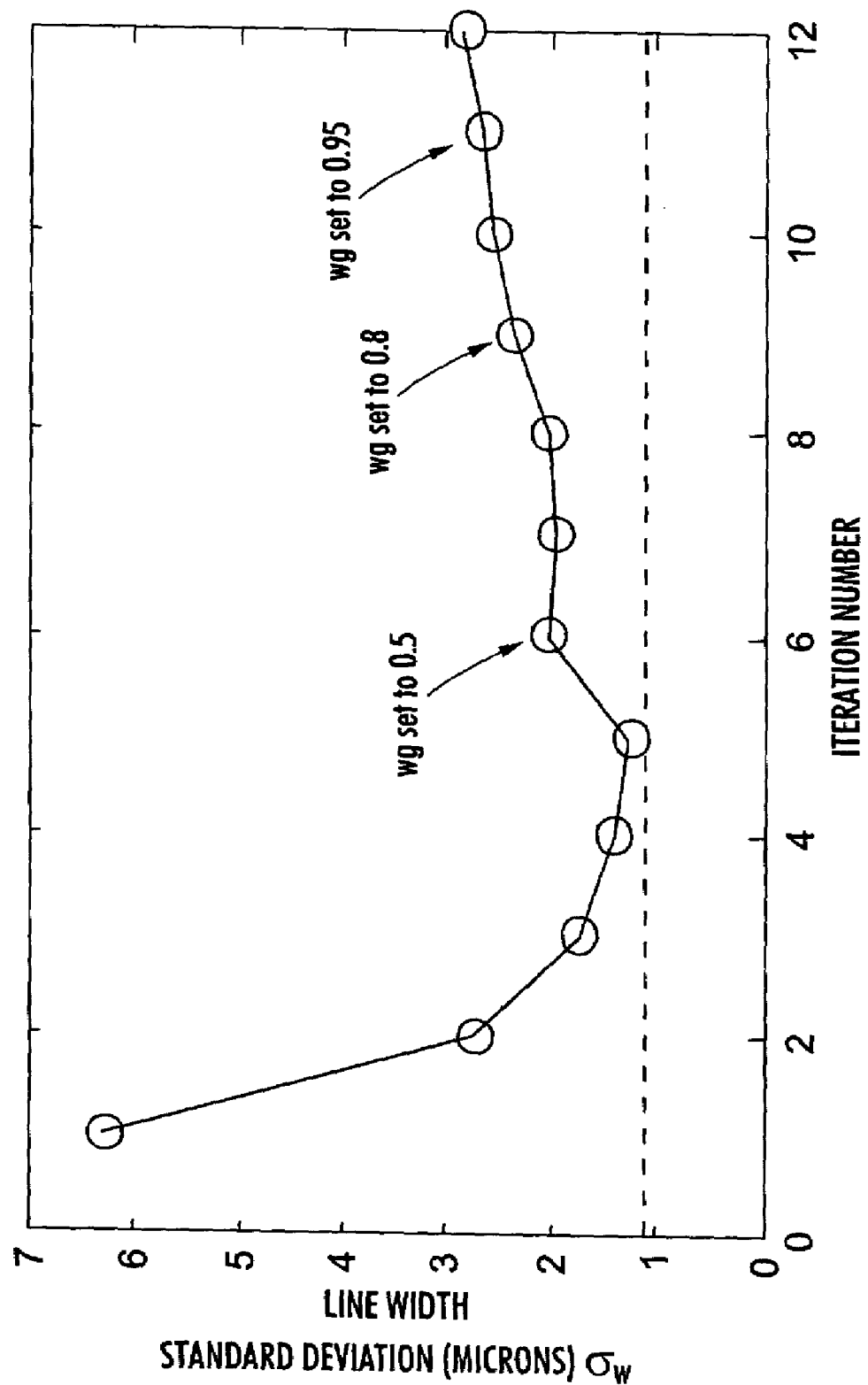
FIG. 8 shows a standard deviation of the line width versus the number of iterations.
Figure 9:
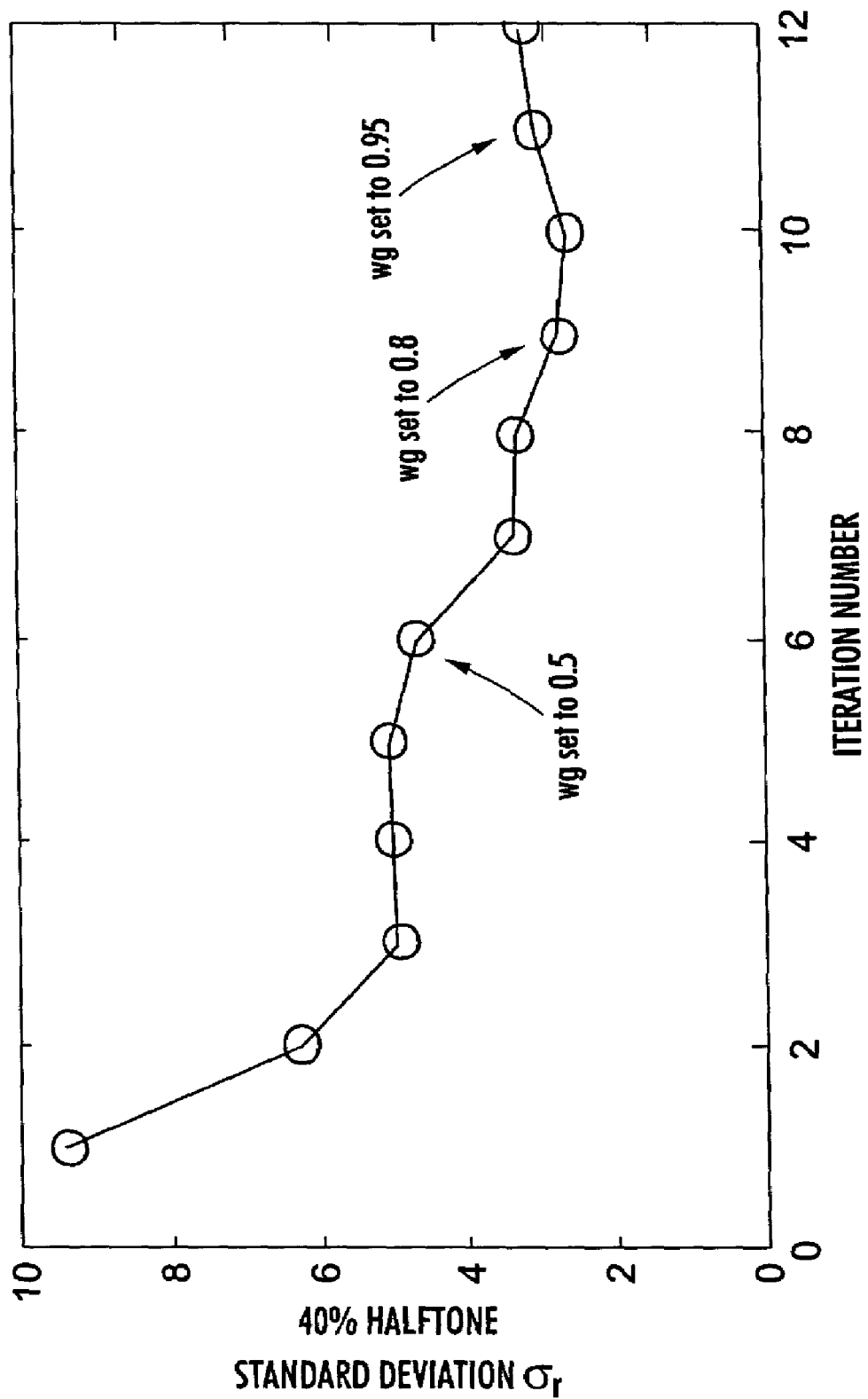
FIG. 9 shows a standard deviation of the 40% halftone strip versus the number of iterations.

With reference to FIGS. 8 and 9, the control methodology approach 10 is used to calibrate the LED imager for 40% halftone., The gain f is chosen to be equal to 0.5, the line width sensitivity is measured to be equal to 0.895 $\mu m/U_{DAC}$, and the halftone reflectance sensitivity at 40% is measured to be equal to 1.39 $r_{scan}/U_{DAC}$. Initially, five iterations are performed with the weight $w_g$ set to 0. When the line width noise appears to go to a minimum, the weight $w_g$ is set to 0.5 and three more iterations are performed. The weight $w_g$ is next set to 0.8 and two more iterations are performed. Finally, the weight $w_g$ is set to 0.95 and two final iterations are performed.

With continuing reference to FIG. 8, the line width standard deviation $\sigma_w$ is plotted as a function of the iteration number. For the weight $w_g$ equal to 0, the line standard deviation $\sigma_w$ appears to saturate at a lower value as the number of iterations increase. The measured line width standard deviation is equal to about 1.14 μm. As the weight $w_g$ is increased, the line width noise becomes larger.

With reference again to FIG. 9, the standard deviation $\sigma_r$ of the reflectance of the 40% halftone strip is plotted as a function of the iteration number. As soon as the weight $w_g$ is increased from zero, there is a marked improvement in uniformity. However, there is less improvement in uniformity as characterized by the standard halftone strip reflectance deviation metric $\sigma_r$ for larger values of the weight $w_g$.

Of course, it is also contemplated that other metrics for lines uniformity and strips uniformity can be used.

Figure 10:
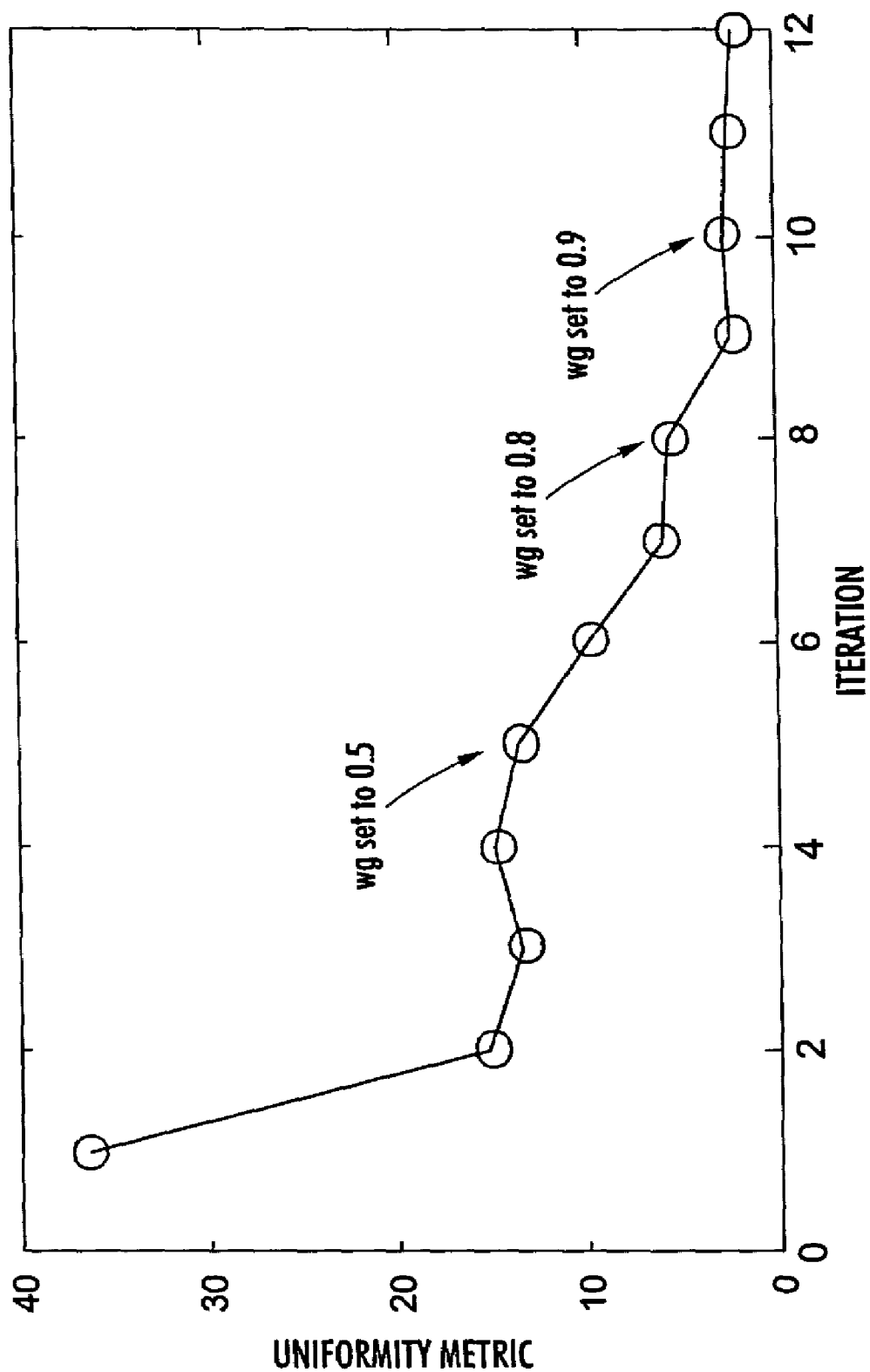
FIG. 10 shows the uniformity matrix versus the number of iterations.

With reference to FIG. 10, in one embodiment, another metric for the halftone strip uniformity such as a perception of uniformity can be used to better characterize the improvement in uniformity. One example of such metric is a reflectance uniformity metric. For example, the reflectance uniformity matrix can be generated by calculating the Fourier transform of the profile in scanner reflectance unit, subtracting a constant representing a level of background noise, e.g. 0.2, from the Fourier transform and summing all positive amplitudes in a range where the eye is most sensitive. One choice of a range is a lower bound of 0.035 cycles/mm and an upper bound of 1.54 cycles/mm. Such uniformity metric is plotted as a function of iteration number in FIG. 11. Using the uniformity metric, a performance improvement factor of about 16 is observed. There is a distinguished improvement in uniformity as characterized in the uniformity metric as the weight $w_g$ given to the strip uniformity is changed from 0 to 0.5 and then again when the weight $w_g$ is changed from 0.5 to 0.8.

Using multiobjective optimization to make both the halftone strips reflectance and the line widths uniform drastically increases the image uniformity. For the examples discussed above, the halftone strips uniformity increased only a factor of about 2 by equalizing line widths, but increased another factor of about 10 when using multiobjective optimization.

Figure 11:
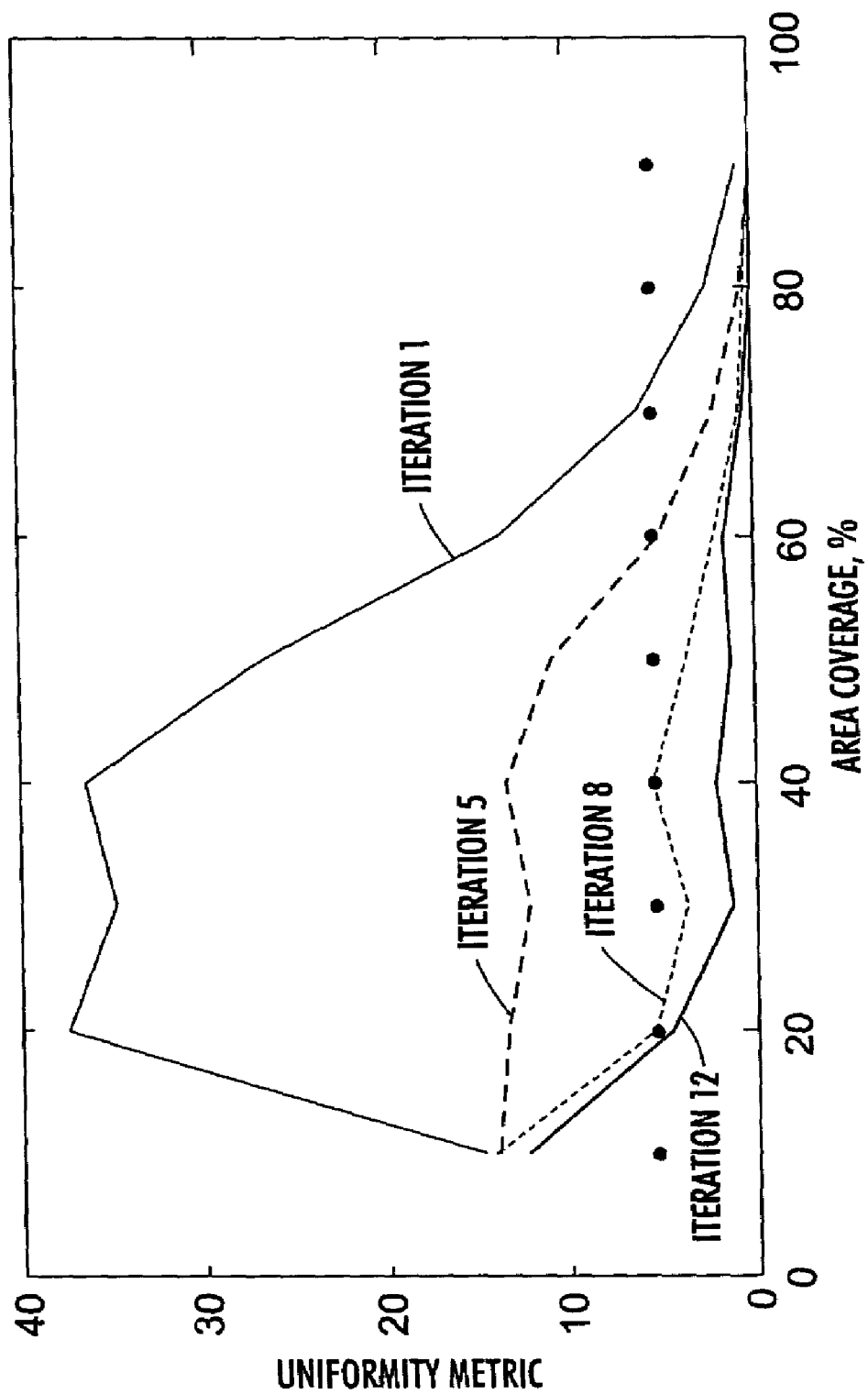
FIG. 11 shows uniformity matrix versus area coverage different numbers of iterations.

With reference to FIG. 11, the uniformity metric is plotted as a function of the area coverage at Iterations 1, 5, 8, 12. The function at Iteration 0 represents no correction. The functions at Iterations 5, 8 and 12 are given respective weights $w_g$=0.0, $w_g$=0.5, and $w_g$=0.9. Because the shape of the dots is different for each area coverage, the sensitivity to the change in exposure is different for the different arrangements of dots. As illustrated, there is little improvement for an area coverage of about 10% from one iteration to another. There is a significant improvement for area coverages from about 20% to about 50%. There is a smaller improvement for area coverages of about 50%. The uniformity can be significantly improved simultaneously in each halftone strip by controlling the density of the halftones in a way that depends on the halftone screen as discussed below. First a specific embodiment is discussed and then the description of the technique is generalized.

Figure 12:
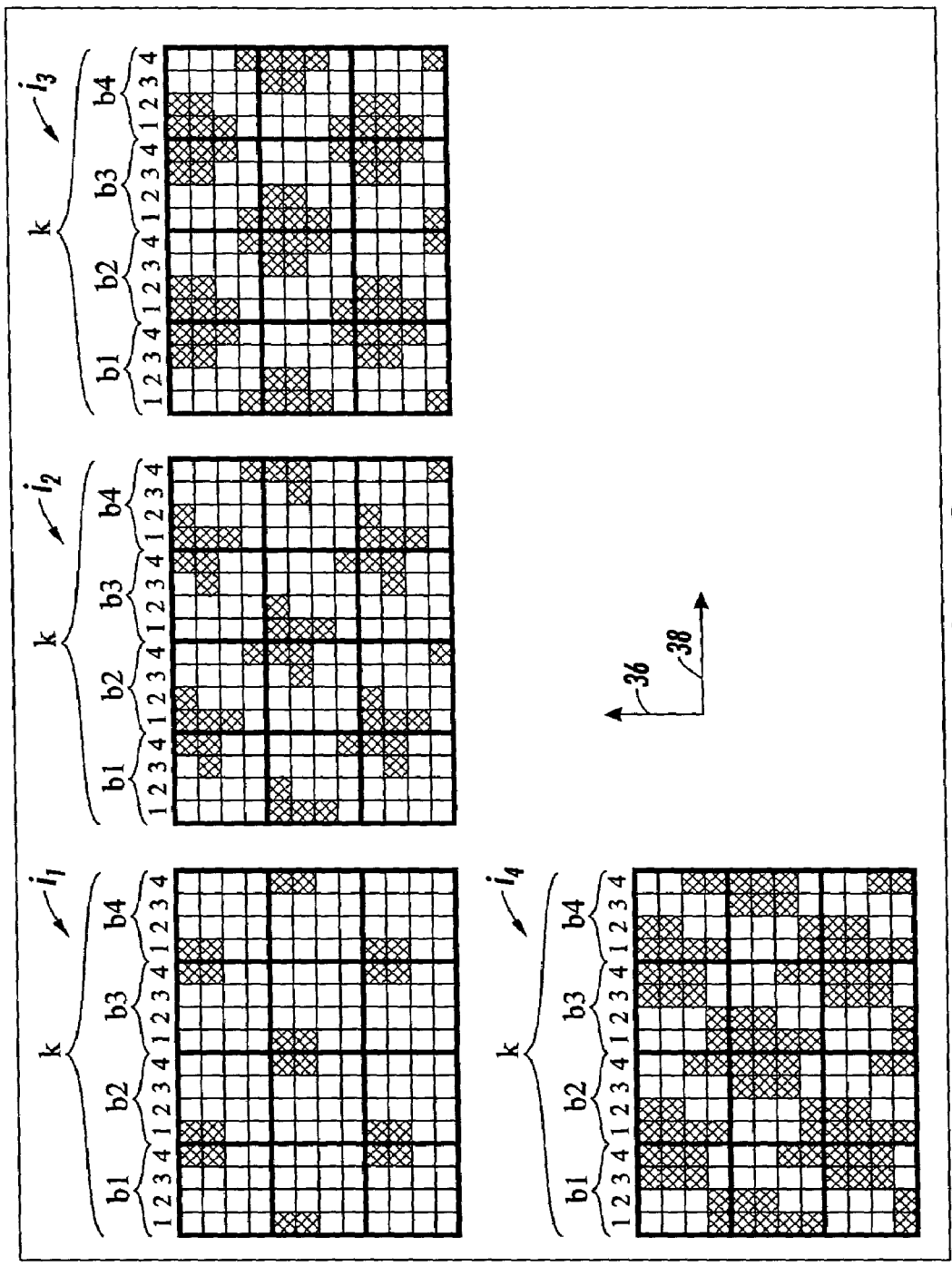
FIG. 12 diagrammatically shows bitmaps at different area coverages.

With reference to FIG. 12, first, second, third, and fourth bitmaps $i_1$, $i_2$, $i_3$, $i_4$ for a respective 32 level first, second, third, and fourth halftones at area coverages of 12.5%, 25%, 37.5%, and 50% are shown. The process direction 36 is vertical and the cross process direction 38 is horizontal. The repeat distance in the cross process direction 38 is four pixels for data averaged over the process direction 36. The adjustment of the exposures by considering the LEDs in groups of four provides additional flexibility of adjusting some halftone levels without affecting others.

In one embodiment, at a first location, the first halftone $i_1$, e.g. the halftone of the 12.5% area coverage, is uniform; while the second halftone $i_2$, e.g. the halftone of the 37.5% area coverage, has a light streak (not shown). The first halftone $i_1$, of 12.5% area coverage has no bits ON in independent columns 2 and 3. By adjusting the exposures only in independent columns 2 and 3, the second halftone $i_2$ level at 37.5% area coverage can be made darker without affecting the first halftone $i_1$ at 12.5% area coverage. The adjustment procedure can be generalized to an arbitrary set of i halftone levels or strips and repeat period in the cross process direction 38. As discussed below, from the different area coverages of the different halftone screens, a set of i levels is selected. The uniformity adjustment is made for the selected set of i levels such that, as a result of the adjustment, all area coverages become substantially uniform.

More generally, consider a halftone with a repeat period $N_p$ in the cross process direction. In the embodiment described above, $N_p$=4. For each cluster of $N_p$ pixel columns, one can assumed them into $N_s$ groups. In the embodiment described above, $N_p$=4 and $N_s$=4.

Figure 13:
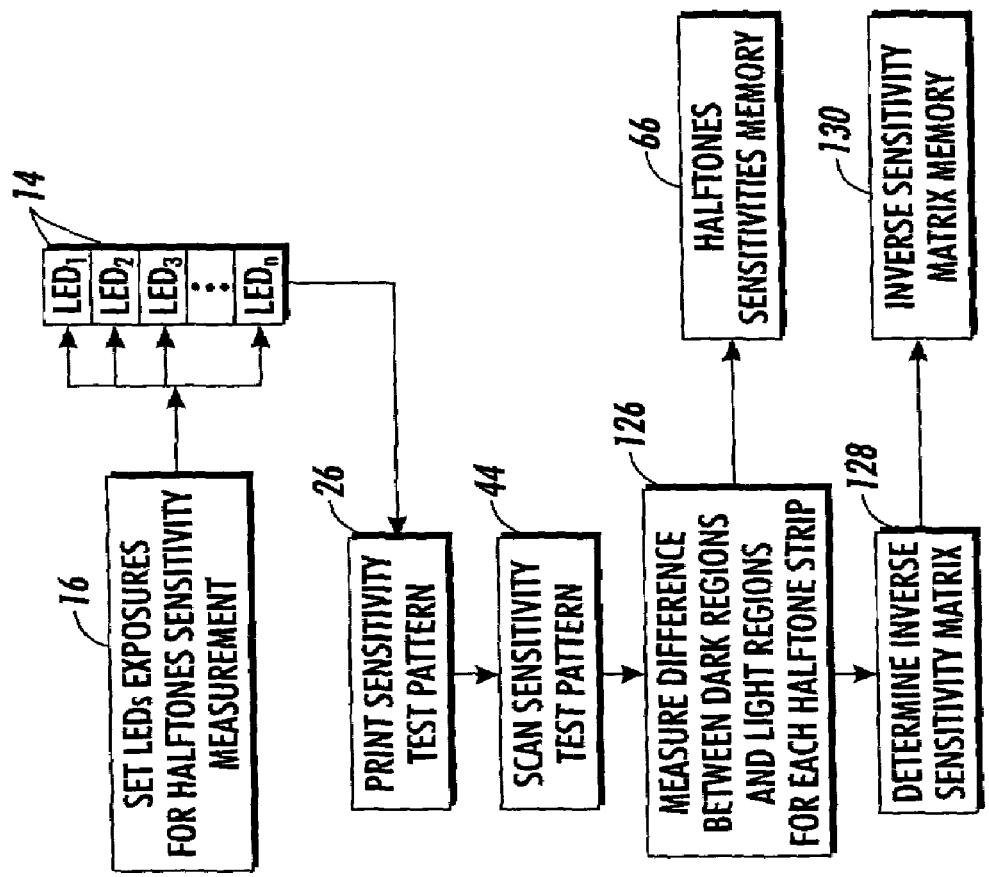
FIG. 13 shows a detail of a portion of a flow chart of FIG. 2.
Figure 14:
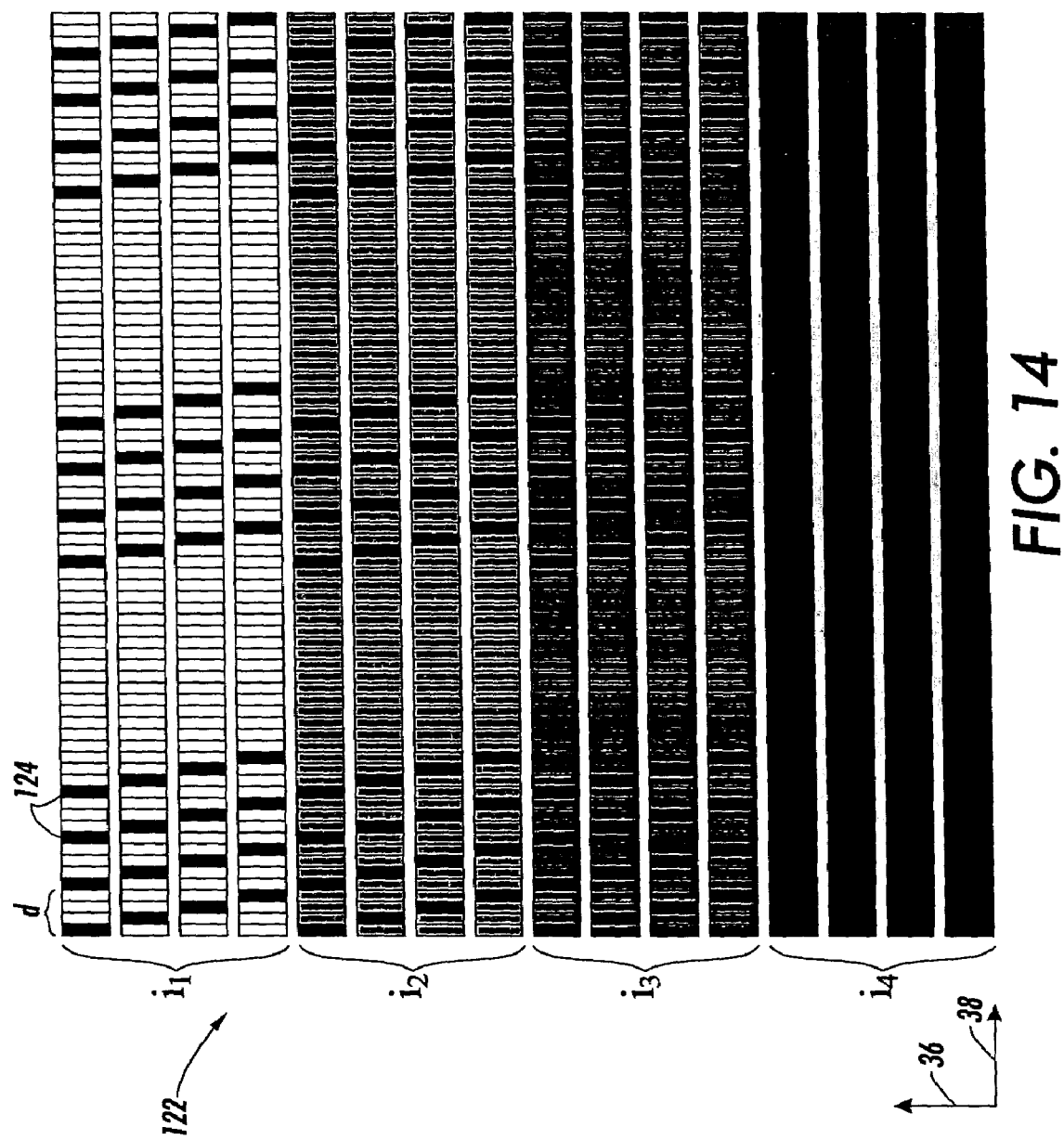
FIG. 14 shows a halftone sensitivity target pattern.

With reference to FIGS. 13 and 14, a halftone strips sensitivity test pattern or target or screen 122 is printed 26 for experimentally determining the halftone levels sensitivity to the change in exposure. Let $r_i$ be the scanner response to halftone level i. Let k be the index of a pixel column combination that is adjusted, where k ranges from 1 to $N_p$. Each k can refer to the adjustment of more than one LED in each LED cluster. The change of the reflectance sensitivity of halftone strip i to a change in exposure of $U_{DAC}$ or intensity of LED in the LED pixel columns referenced by the index k is given by:

$$g_{ri}=\partial r_i/\partial e_k, \text{ where} \qquad (2)$$

$\partial r_i/\partial e_k$ is the change in the scanner response to the density of the halftone strip i to the change in exposure of all the pixel columns referenced by index k.

With continuing reference to FIG. 14, for example, four halftone levels $i_1$, $i_2$, $i_3$, and $i_4$, which are indicated by varying gray level, are printed for measurement. A cross process repeat distance $N_p$ of the sensitivity target 122 is four pixels. A thick bar 124 indicates LEDs for which the intensity is increased. For each of the $N_s$ pixel column combinations, a sensitivity target strip can be created. If there are $N_{LED}$ LEDs in the print bar, then there are $N_{LED}/N_P$ pixel clusters. The pixel clusters are divided into two groups. In one group, for each of the $N_s$ pixel column combinations, the LEDs are adjusted, for example, by 10 exposure units; while for the other groups the LEDs are not adjusted. In this manner, a periodic pattern is induced in each halftone strip. The measurement of an amplitude of the periodic pattern of each strip yields the sensitivity of the strip i to the change of intensity in the LEDs referenced by the index k.

With reference again to FIG. 13 and continuing reference to FIG. 14, the halftone strips sensitivity target 122 is scanned 44. The differences between the dark regions and the light regions or sensitivity of each halftone strip to the change in exposure of the LEDs of the cluster k are measured 126 to determine how sensitive each halftone strip i is to turning brighter the LEDs in the cluster k. The sensitivity caused by adjusting columns k in the strip i is given by $\partial r_i/\partial e_k$.

For example, as shown in FIG. 12, the LEDs are grouped in bins $B_1$, $B_2$, $B_3$, $B_4$ of four LEDs each. The scanner response averaged in the process direction of each bin is given by $r_{ik}$, where i indices the halftone levels and k indices the bin number. The aim value $r_{i0}$ for each halftone strip i is taken to be the average response, or $$r_{i0} = \sum_{k=1}^{N_s} r_{ik} \text{ where}$$

$r_{ik}$ is the luminosity of the bin k.

The change required for the halftones to be uniform can be defined as $$\Delta r_{ik} = r_{ik} - r_{i0}$$

To adjust the uniformity, the deviation of the density of g different halftone strips of different area coverages from uniformity are measured. They area coverage is measured at the same resolution of the pixel column clusters. Therefore, for each pixel column cluster, a vector $[\Delta r_1, \Delta r_2, \ldots, \Delta r_g]$ can be defined. The LED exposure changes to the reflectance changes can be expressed with the following matrix equation:

$$\begin{pmatrix} \Delta r_1(x) \\ \Delta r_2(x) \\ \vdots \\ \Delta r_g(x) \end{pmatrix} = \begin{pmatrix} \partial r_1/\partial e_1 & \partial r_1/\partial e_2 & \cdots & \partial r_1/\partial e_{N_s} \\ \partial r_2/\partial e_1 & \partial r_2/\partial e_2 & & \\ \vdots & & \ddots & \\ \partial r_g/\partial e_1 & & & \partial r_g/\partial e_{N_s} \end{pmatrix} \begin{pmatrix} \Delta e_1(x) \\ \Delta e_2(x) \\ \vdots \\ \Delta e_{N_s}(x) \end{pmatrix}, \text{ where} \quad (3)$$

$\Delta e_{N_s}$ is the change in exposure for the LEDs indexed by k, $\Delta r_g$ is a reflectance vector measured as a difference between an average scanner reflectance of the strip g, $\partial r_g/\partial e_{N_s}$ is the change in sensitivity of the average reflectance of the halftone strip i to the change in exposure of the LEDs in the bin k; and x is a position in the cross process direction.

With reference again to FIG. 13, the sensitivity matrix of the Equation (3) is inverted 128. The inverse halftone sensitivity matrix is stored in an inverse sensitivity matrix memory 130. Multiplying the inverse sensitivity matrix by the measured deviations of the strip responses from uniformity for each pixel column cluster gives the changes in the exposures required to achieve uniformity.

Figure 15:
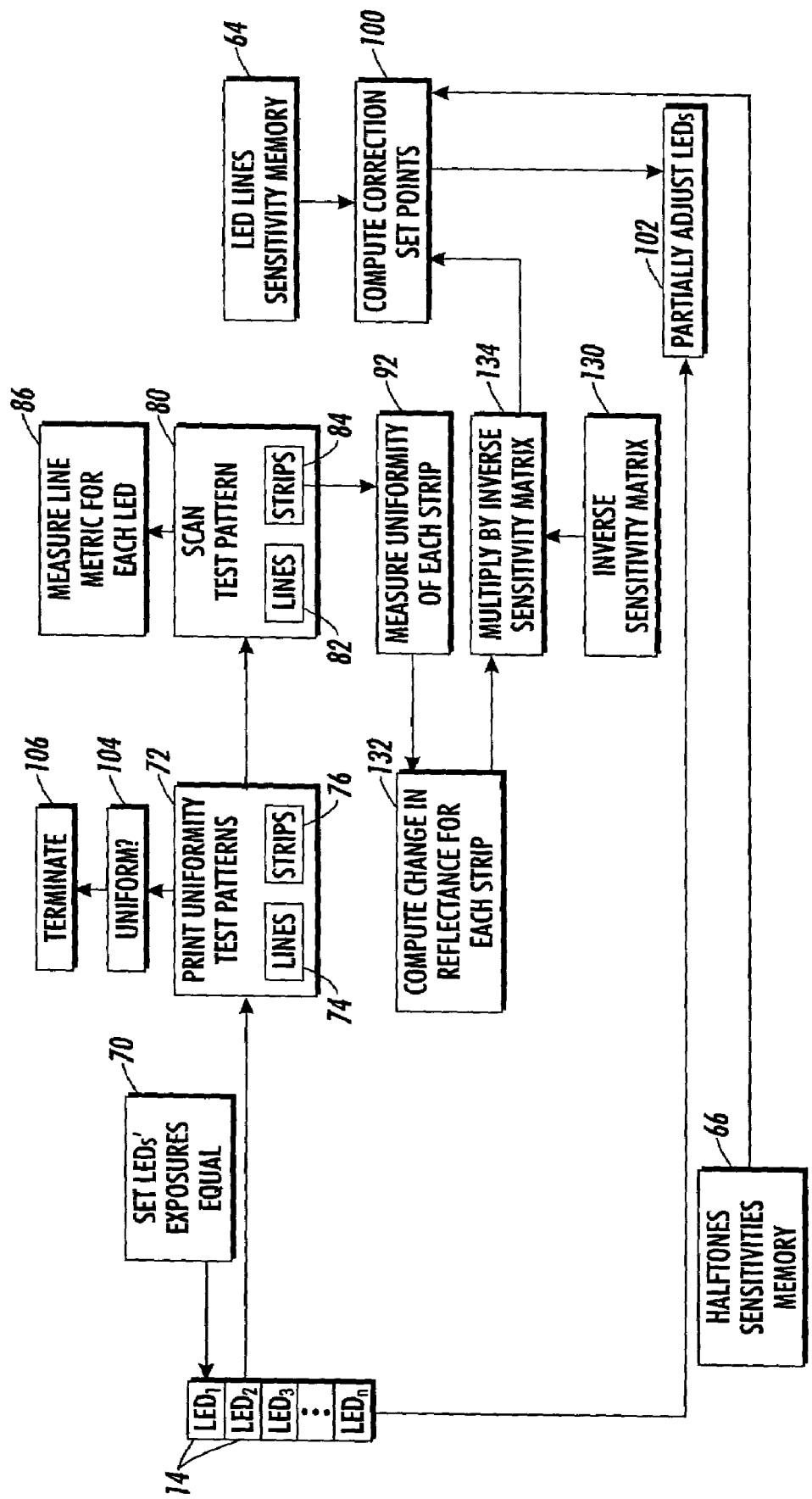
FIG. 15 shows another portion of a flow chart of a control methodology.

With reference to FIG. 15, similar to the method 10 of FIG. 2, the exposures of the LEDs 14 are set 70 to the equal value, preferably at a halfway between the minimum and maximum set points. The uniformity test print 18 is printed 72 and scanned 80. The reflectance measurements of each line are extracted to measure 86 each line's metric, such as the line width $w_i$ for each LED. The scanner reflectance is measured 92 for each halftone strip. The halftone strips change in reflectance to the change in exposure for the LEDs in each bin k is computed 132 to derive the reflectance vector $\Delta r_i$ of the Equation (3).

From the measurements, a new set of correction set points for the digital to analog converters $U_{DACs}$ is computed 100 according to the equation:

$$u'_i = u_i - (1 - w_g)\left(\frac{f}{g_0}\right)(w_i - \overline{w}) + w_g \Delta e, \text{ where} \quad (4)$$

$u'_i$ is the new setpoint of the LED intensity,
$u_i$ is the original setpoint of the LED intensity,
i is the LED index, $g_0$ is the average line width sensitivity depending on the $U_{DAC}$ setting, f is a gain or a fraction of adjustment to be made each iteration, $w_i$ is the measured line width, $\overline{W}$ is the averaged line width, $w_g$ is the relative weight assigned to the gray level in the optimization of the uniformity, and $\Delta e$ is the change in exposure for the LEDs which can be derived from the solution of Equation (3).

The change in exposure $\Delta e$, which is required to produce a uniform image, is received by multiplying 134 the reflectance vector $\Delta r_i$ by the inverse reflectance sensitivity matrix. The weight $w_g$ and gain f are adjusted in fractions as explained above. After the partial adjustment is made 102 to each $U_{DAC}$, the uniformity test pattern 18 is printed again 72 and the process is repeated. When a required uniformity confirming to the uniformity criteria 104 in both uniformity test patterns is achieved, the iterative process is terminated 106.

The procedures described above may be implemented to make LEDs in LED light bars uniform after manufacture of the printer. Before the printer is shipped to the customer, a series of iterations is run to make the line width and halftones uniform. Such procedure not only makes the LED bar uniform, but eliminates streaking due to other xerographic subsystems.

Another implementation is to correct for streaking that appears as the machine ages, both due to the LED bar and other xerographic subsystems. One of the failure modes of LED bars is that as the elements age (differently), their light output drops. This drop can be estimated from the time each LED element has been on. If this on time is too long, the machine diagnostics can initiate a service call or even ask the customer to perform the normalization procedure.

It will be appreciated that variants of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of adjusting print uniformity for a xerographic device having an LED printbar, the method comprising:

(a) printing lines test pattern on a first target media in a process direction of the xerographic device, each test pattern line being associated with an individual LED of the LED printbar;

(b) printing halftone strips test pattern on a second target media in the process direction of the xerographic device, each halftone test strip including an arrangement of dots, each dot being associated with designated LEDs of the LED printbar and each halftone strip being associated with a halftone gray level i;

(c) scanning the first and second target media with the test patterns;

(d) measuring an LED line metric of each test pattern line and reflectance uniformity of each test halftone strip;

(e) concurrently calculating a lines uniformity difference profile, and a set of halftone strips uniformity difference profiles, including:
calculating first differences between each LED line metric and a first target value, and calculating second differences between each halftone strip uniformity profile and a second target value; and (f) adjusting current value supplied to each LED associated with the test patterns to make corresponding partial corrections to the first and second differences respectively, to simultaneously optimize the print uniformity as a composite of the lines test pattern and the halftone strips test pattern wherein the partial corrections are proportional to sensitivities of the line uniformity profile difference metric and the halftone uniformity profile difference metric to the adjusting of the LED current value.

2. The method of claim 1, further including:
calculating a metric of the first differences of the lines uniformity difference profile;
calculating a metric of the second differences of each halftone strip uniformity difference profile; and
iteratively performing steps (a) through (f) until the metric of the first differences of the lines uniformity profile is less than a first predetermined threshold while the metric of the second differences of each halftone strip uniformity profile is less than a second predetermined threshold.

3. The method of claim 1, wherein the adjusting of the current values includes making a first partial correction to the first differences, and a second partial correction to the second differences to partially reduce the first and second differences, and further including:
calculating a metric of the first differences of the lines uniformity difference profile;
calculating a metric of the second differences of each halftone strip uniformity difference profile; and
iteratively performing steps (a) through (f) until the metric of the first differences of the lines uniformity profile is less than a first predetermined threshold and the metric of the second differences of each halftone strip uniformity profile is less than a second predetermined threshold.

4. The method of claim 1, further including:
measuring an average sensitivity of the line uniformity profile difference metric to the change in the LED current values; and
measuring an average sensitivity of each halftone strip uniformity profile difference metric to the change in the LED current values.

5. The method of claim 4, wherein the measuring of the average sensitivity of each halftone strip uniformity profile difference metric to the change in the LED current values includes:
(a) splitting LEDs into bins, each bin including a number of the LEDs, and a plurality of halftone dots;
(b) adjusting LEDs' currents in selected bins to a predetermined higher value;
(c) adjusting LEDs' currents in remaining bins to a predetermined lower value;
(d) printing a halftones sensitivity test pattern, in which the dots printed by the LEDs of the higher current bins are printed darker compared to the dots printed by the LEDs of the lower current bins;
(e) scanning the halftones sensitivity test pattern; and
(f) for each halftone gray level, measuring a difference between an average reflectance of the darker bins and an average reflectance of the lighter bins.

6. The method of claim 4, wherein the measuring of the average sensitivity of each halftone strip uniformity profile difference metric to the change in the LED current values includes:
(a) creating a halftone screen which includes g halftone strips and is periodic when averaged in the process direction;
(b) identifying LED sets of $N_s$ LEDs each, wherein each set of LEDs has the same phase relation to the halftone screen averaged in the process direction; and
(c) building a halftones sensitivity matrix of Equation (3), each member of which represents the change of sensitivity in each halftone strip g to the change in current for the LEDs in each LED set:

$$\begin{pmatrix} \Delta r_1(x) \\ \Delta r_2(x) \\ \vdots \\ \Delta r_g(x) \end{pmatrix} = \begin{pmatrix} \partial r_1/\partial e_1 & \partial r_1/\partial e_2 & \cdots & \partial r_1/\partial e_{N_s} \\ \partial r_2/\partial e_1 & \partial r_2/\partial e_2 & & \\ \vdots & & \ddots & \\ \partial r_g/\partial e_1 & & & \partial r_g/\partial e_{N_s} \end{pmatrix} \begin{pmatrix} \Delta e_1(x) \\ \Delta e_2(x) \\ \vdots \\ \Delta e_{N_s}(x) \end{pmatrix} \quad (3)$$

where $\partial r_g/\partial e_{N_s}$ is the change in sensitivity of the average reflectance of the halftone strip g to the change in exposure of the LEDs in the LED set;
$\Delta r_g$ is a reflectance vector measured as a difference between the average reflectance of the halftone strip g when the currents of the LEDs of the LED set are adjusted and the average reflectance of the halftone strip g when the currents of the LEDs of the LED set are not adjusted;
$\Delta e_{N_s}$ is a change in exposure for the LEDs in the set j from the present current value; and
x is a position in the cross process direction.

7. The method as set forth in claim 6, further including: calculating an inverse sensitivity matrix.

8. The method as set forth in claim 7, wherein the change in exposure is proportional to the second partial correction and the computing of the change in exposure includes:
multiplying both sides of Equation (3) by the inverse sensitivity matrix:

$$\begin{pmatrix} \Delta e_1(x) \\ \Delta e_2(x) \\ \vdots \\ \Delta e_{N_s}(x) \end{pmatrix} = \begin{pmatrix} \partial r_1/\partial e_1 & \partial r_1/\partial e_2 & \cdots & \partial r_1/\partial e_M \\ \partial r_2/\partial e_1 & \partial r_2/\partial e_2 & & \\ \vdots & & \ddots & \\ \partial r_g/\partial e_1 & & & \partial r_g/\partial e_{N_s} \end{pmatrix}^{-1} \begin{pmatrix} \Delta r_1(x) \\ \Delta r_2(x) \\ \vdots \\ \Delta r_g(x) \end{pmatrix} \quad (4)$$

where x is a position in the cross process direction.

9. The method as set forth in claim 8, further including:
applying the second partial correction to each LED set of $N_S$ LEDs in the cross process direction.

10. The method of claim 4, wherein the measuring the average sensitivity of the line uniformity profile difference metric to the change in the LED current value includes:
splitting the LEDs into first LEDs and second LEDs;
supplying higher current to the first LEDs and lower current to the second LEDs;
printing a first sensitivity lines test pattern with the LEDs;
supplying higher current to the second LEDs and lower current to the first LEDs;
printing a second sensitivity lines test pattern with the LEDs;
scanning the first and second sensitivity test patterns;

measuring a first average line metric of each line printed with each higher current LED in the first and second sensitivity test patterns;

measuring a second average line metric of each line printed with each lower current LED in the first and second sensitivity test patterns; and determining the average sensitivity of the line metric of each LED to the change in the current setting as a function proportional to a difference between the first and second average line metric.

11. The method of claim 4, wherein the measuring the average sensitivity of each halftone uniformity profile difference metric to the change in the LED current includes:

splitting the LEDs into first LEDs and second LEDs;

supplying higher current to the first LEDs and lower current to the second LEDs;

printing a first sensitivity halftones test pattern with the LEDs;

supplying higher current to the second LEDs and lower current to the first LEDs;

printing a second sensitivity halftones test pattern with the LEDs;

scanning the first and second sensitivity halftones test patterns;

measuring a first average reflectance of each halftone strip printed with the higher current LEDs in the first and second sensitivity test patterns;

measuring a second average reflectance of each halftone strip printed with the lower current LEDs in the first and second sensitivity test patterns; and determining the average sensitivity of the halftone strip reflectance to the change in the current setting as a function proportional to a difference between the first and second averaged reflectance.

12. The method of claim 1, wherein the LED line metric is at least one of:

a summed line reflectance metric, an integrated line reflectance metric, a minimum line reflectance metric, and a line width metric.

13. The method of claim 1, further including:

prior to printing the test patterns, adjusting the current supplied to each LED of the LED printbar to an equal value.

14. The method of claim 13, further including:

adjusting the current supplied to each LED of the LED printbar to a midrange value.

15. The method of claim 1, wherein the printing of the lines test pattern includes:

printing a staggered lines test pattern.

16. The method of claim 15, further including:

printing test lines by each LED in multiple random locations.

17. The method of claim 1, wherein the LED line metric is a line width metric and further including:

calculating an average line width for the printed test pattern lines from the measured line widths, and using the result as the first target value.

18. The method of claim 1, further including:

calculating an average reflectance of each test halftone strip, and using the result as the second target value.

19. A xerographic device comprising:

an LED printbar for printing a test pattern on a target media, which LED printbar includes a plurality of LEDs;

a scanner device for scanning the target media, and detecting the printed test pattern on the target media;

a computer in operative communication with the LED printbar and the scanner, the computer is programmed to iteratively perform steps of:

determining first measurements for repeated lines of a lines test pattern representative of a line characteristic, each repeated line being printed with an associated LED of the printbar;

determining second measurements for each halftone strip of a halftone strips test pattern representative of a halftone characteristic, each halftone strip including a plurality of prearranged dots, which determine the halftone strip density, each dot being associated with designated LEDs of the printbar;

concurrently calculating a lines uniformity difference profile, and a set of halftone strips uniformity difference profiles, including:

calculating first differences between the first measurements of each test pattern line and a first target value, and second differences between the second measurements of each halftone test strip and a second target value;

computing an input current adjustment for each LED associated with the test patterns to simultaneously optimize uniformity in the lines test pattern and the halftone strips test pattern;

adjusting the input current supplied to each LED associated with the test patterns for effecting a proportional reduction in the first and second differences in accordance with respective sensitivities of the first and the second measurements to the adjusting of the input current;

facilitating reprinting of the test patterns with the adjusted input currents;

facilitating scanning and remeasuring of the reprinted test patterns; and terminating the iterative steps when the uniformity in the lines and halftone strips test patterns meets a predetermined uniformity criteria.

* * * * *